(12) United States Patent
Pagett et al.

(10) Patent No.: US 12,722,772 B2
(45) Date of Patent: Sep. 1, 2026

(54) JOINT ASSEMBLY

(71) Applicant: Airbus Operations Limited, Filton (GB)

(72) Inventors: Jacob Pagett, Filton (GB); Connor Evans, Filton (GB)

(73) Assignee: AIRBUS OPERATIONS LIMITED, Filton (GB)

( * ) Notice: Subject to any disclaimer, the term of this patent is extended or adjusted under 35 U.S.C. 154(b) by 0 days.

(21) Appl. No.: 19/294,598

(22) Filed: Aug. 8, 2025

(65) Prior Publication Data

US 2026/0048831 A1 Feb. 19, 2026

(30) Foreign Application Priority Data

Aug. 16, 2024 (GB) ..................................... 2412115

(51) Int. Cl.
*B64C 3/28* (2006.01)
*B64C 3/18* (2006.01)

(52) U.S. Cl.
CPC ................ *B64C 3/28* (2013.01); *B64C 3/185* (2013.01)

(58) Field of Classification Search
CPC ........................................................ B64C 3/28
See application file for complete search history.

(56) References Cited

U.S. PATENT DOCUMENTS 11,192,624 B2 * 12/2021 Schlipf ...................... B64C 3/26
2020/0115031 A1 * 4/2020 Evans ........................ B64C 3/26
2023/0174217 A1 * 6/2023 Ibanez-Gil .............. B64C 3/185
244/123.1

FOREIGN PATENT DOCUMENTS

GB 478369 A 1/1938

OTHER PUBLICATIONS

United Kingdom Search Report for corresponding United Kingdom Patent Application No. 2412115.4 dated Jan. 22, 2025.

* cited by examiner

*Primary Examiner* — Richard G Davis
(74) *Attorney, Agent, or Firm* — Greer, Burns & Crain, Ltd.

(57) ABSTRACT

A joint assembly has an eccentric bush for rotatably mounting to the first aircraft component. The eccentric bush has a rotational axis. A projection is mounted on the eccentric bush such that rotation of the eccentric bush about its rotational axis causes movement of the projection in both a first and a second orthogonal direction relative to the first aircraft component. The first and second orthogonal directions are substantially perpendicular to the rotational axis of the eccentric bush. A rail rotatably mounts to the second aircraft component. The rail has a longitudinal axis which extends in a direction substantially parallel to the second orthogonal direction. The projection has an aperture for receiving the rail. The rail has a threaded surface which is configured to engage with a correspondingly threaded surface of the aperture.

15 Claims, 5 Drawing Sheets

JOINT ASSEMBLY

CROSS-REFERENCES TO RELATED APPLICATIONS

This application claims the benefit of Great Britain Patent Application Number 2412115.4 filed on Aug. 16, 2024, the entire disclosure of which is incorporated herein by way of reference.

FIELD OF THE INVENTION

The present invention relates to a joint assembly for joining a first aircraft component to a second aircraft component, an airfoil structure comprising said joint assembly, an aircraft comprising said airfoil structure, and to a method of joining a first aircraft component to a second aircraft component.

BACKGROUND OF THE INVENTION

Airfoil structures that are found in a variety of aircraft, spacecraft and wind turbine applications typically comprise a torsion box structure, which includes one or more longitudinal spars, a plurality of transverse ribs, and is enclosed by structural covers. A fixed leading edge (FLE) structure and/or a fixed trailing edge (FTE) structure may be attached to such a torsion box structure to form an airfoil shape.

The overall shape of the airfoil structure must conform to a predefined shape, in order to provide desired aerodynamic properties. Any misalignment of various members may result in a shape deviation, which when operated in an aerodynamic flow might result in unintended performance and handling qualities of the airfoil structure.

Therefore, the exact final position of the various members relative to one another in the assembled airfoil structure (i.e. when fixed in an operational configuration) is of critical importance throughout the assembly process. Variations in the dimensions of the components of the airfoil structure from an engineering ideal (normally governed by manufacturing drawings) must be controlled within pre-determined angular and linear dimension limits (commonly referred to as engineering tolerances).

Notably, airfoil structures in particular are often manufactured to exceptionally small engineering tolerances and hence can take a lot of time to assemble (which adversely effects production throughput).

Increasing production throughput is a common goal throughout the aircraft manufacturing industry to help meet the growing global demand for aircraft, which necessitates faster aircraft delivery times.

As such, it is an aim of the present invention to provide a solution to this problem.

SUMMARY OF THE INVENTION

According to a first aspect of the invention, there is provided a joint assembly for joining a first aircraft component to a second aircraft component, said joint assembly comprising:

- an eccentric bush for rotatably mounting to a first aircraft component, said eccentric bush comprising a rotational axis;
- a projection mounted on said eccentric bush such that rotation of the eccentric bush about its rotational axis causes movement of the projection in both a first and a second orthogonal direction relative to the first aircraft component, wherein said first and second orthogonal directions are substantially perpendicular to the rotational axis of the eccentric bush; and
- a rail for rotatably mounting to a second aircraft component,
- wherein the rail has a longitudinal axis which extends in a direction substantially parallel to the second orthogonal direction,
- wherein the projection comprises an aperture for receiving said rail, and
- wherein the rail comprises a threaded surface which is configured to engage with a correspondingly threaded surface of the aperture such that, when the rail is received within the aperture, axial rotation of the rail relative to the aperture causes the projection to move along the rail in the second orthogonal direction.

Advantageously, the provision of a single eccentric bush enables the position of the projection to be adjusted in the first orthogonal direction which enables precise control of the steps or gaps between the first and second aircraft components as may be necessary to ensure that said parts comply with the requisite engineering tolerances of the aircraft.

Meanwhile, the provision of the rail allows the joint assembly to account for any unwanted changes in the position of the projection in the second orthogonal direction following rotation of the eccentric bush.

For example, in embodiments in which the rail is orientated in the spanwise direction, the vertical (or thickness-wise) position of the projection can be adjusted via rotation of the eccentric bush and any subsequent changes in the lateral (or spanwise) position of the projection following rotation of the eccentric bush can be accounted for via rotating the rail about its axis to adjust the lateral (or spanwise) position of the projection.

Alternatively, in embodiments in which the rail is orientated in the thickness-wise direction, the lateral (or spanwise) position of the projection can be adjusted via rotation of the eccentric bush and any subsequent changes in the vertical (or thickness-wise) position of the projection following rotation of the eccentric bush can be accounted for via rotating the rail about its axis to adjust the vertical (or thickness-wise) position of the projection.

Notably, it has been found that the joint assembly of the claimed invention provides a more ergonomic means of fitting and adjusting aircraft components and hence allows for improved tolerance management and faster assembly times when compared to other known solutions (such as double eccentric bushes).

Furthermore, since double eccentric bushes tend to be large and heavy, the joint assembly of the claimed invention additionally provides a weight and space saving benefit.

In exemplary embodiments, the joint assembly may further comprise a channel for receiving the projection, and the rail may be provided within said channel.

In exemplary embodiments, the channel may be an open channel. In other embodiments, the channel may be a closed channel.

In exemplary embodiments, the joint assembly may further comprise a receptable (e.g., a clevis) for mounting the rail to the second aircraft component. In other embodiments, the rail may be directly mounted to the second aircraft component.

In exemplary embodiments, the receptacle may comprise a pair of end portions between which the channel is defined.

In exemplary embodiments, the rail is axially rotatable relative to the receptacle.

In exemplary embodiments, the end portions of the receptacle may be configured to abut against the eccentric bush when the projection is received within the channel.

Advantageously, abutting the end portions of the receptacle against the eccentric bush helps to prevent unwanted pivoting of the first aircraft component about the rail and also enables the channel/receptable to take up any vertical (or thickness-wise) loads applied to the joint assembly.

In exemplary embodiments, the projection may be a tapered spigot.

In exemplary embodiments, the rail may have a length which is greater than or equal to a distance between the positions of maximum displacement of the projection.

Advantageously, this feature helps to ensure that any corresponding changes in the position of the projection in the second orthogonal direction, following rotation of the eccentric bush, can be accounted for by moving the projection along the rail.

According to a second aspect of the invention, there is provided an airfoil structure comprising:

a first aircraft component;

a second aircraft component; and at least one joint assembly according to the first aspect of the invention, wherein the or each eccentric bush is rotatably mounted to the first aircraft component, and wherein the or each rail is rotatably mounted to the second aircraft component.

In exemplary embodiments, the rotational axis of the eccentric bush may extend in a direction substantially parallel to a chordwise axis of the airfoil structure.

In exemplary embodiments, the longitudinal axis of the rail may extend in a direction substantially parallel to a spanwise axis of the airfoil structure.

Advantageously, joints in aircraft typically experience higher loads in the thickness (or vertical) direction. As such, orientating the rail in the spanwise (horizontal) direction helps to reduce the amounts of stress/loading which are placed on the rail during use.

In exemplary embodiments, the longitudinal axis of the rail may extend in a direction substantially parallel to a thickness-wise (e.g., vertical) axis of the airfoil structure.

Advantageously, orientating the rail in the thickness (or vertical) direction provides easier access to the rail for aircraft maintenance and assembly personnel.

In exemplary embodiments, the joint assembly may further comprise at least one butt-strap extending between the first and second aircraft components.

Advantageously, the provision of a butt-strap helps to reduce chordwise tension loads placed on the rail during use and also helps to prevent unwanted pivoting of the first aircraft component about the rail.

In exemplary embodiments, the airfoil structure may be an aircraft wing.

In exemplary embodiments, the first aircraft component may be a riblet.

In exemplary embodiments, the riblet may form part of a leading-edge assembly.

In exemplary embodiments, the second aircraft component may be a spar.

In exemplary embodiments, the spar may be a forward (e.g., leading-edge) spar of an aircraft wing.

According to a third aspect of the invention, there is provided an aircraft comprising the airfoil structure according to the second aspect of the invention.

According to a fourth aspect of the invention, there is provided a method of joining a first aircraft component to a second aircraft component comprising:

a) rotatably mounting an eccentric bush to a first aircraft component, said eccentric bush comprising a rotational axis and a projection mounted on said eccentric bush such that rotation of the eccentric bush about its rotational axis causes movement of the projection in both a first and a second orthogonal direction relative to the first aircraft component, wherein said first and second orthogonal directions are substantially perpendicular to the rotational axis of the eccentric bush, and wherein the projection further comprises an aperture having a threaded surface;

b) rotatably mounting a rail having a correspondingly threaded surface to a second aircraft component, wherein said rail has a longitudinal axis which extends in a direction substantially parallel to the second orthogonal direction;

c) rotating the eccentric bush about its rotational axis so as to alter a position of the projection in the first orthogonal direction;

d) locating the rail within the aperture provided in the projection such that the threaded surface of the rail engages with the threaded surface of the aperture; and e) axially rotating the rail relative to the aperture so as to move the projection along said rail in the second orthogonal direction so as to account for unwanted changes in the position of the projection in the second orthogonal direction following rotation of the eccentric bush.

Advantageously, it has been found that the aforementioned method provides a more ergonomic means of fitting and adjusting aircraft components and hence allows for improved tolerance management and faster assembly times when compared to other known solutions (such as double eccentric bushes).

In some embodiments, steps a) to e) may be performed sequentially (i.e., in order).

However, it shall be appreciated that in other embodiments, steps a) to e) may be performed in a different (non-sequential) order.

It shall also be appreciated that optional features of the first and second aspects of the invention may be combined with the fourth aspect of the invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
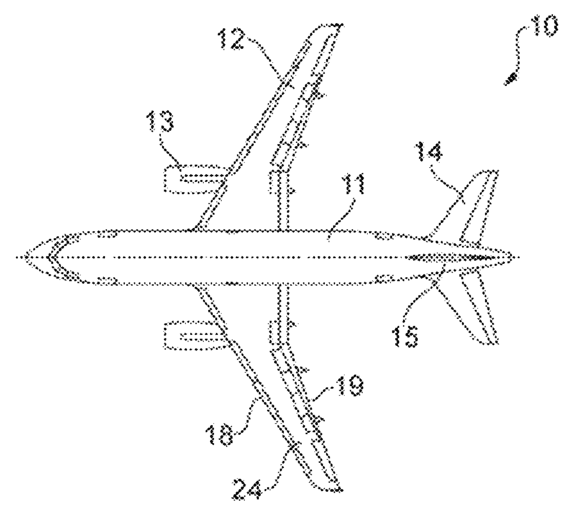
FIG. 1 is a schematic plan view of an aircraft according to an embodiment of the present invention.

FIG. 1 shows an aircraft 10. The aircraft 10 has a fuselage 11, and starboard and port fixed wings 12. An engine 13 is mounted to each wing 12. The aircraft also comprises an empennage (or tail assembly) which includes starboard and port horizontal stabilisers 14 and a vertical stabiliser 15.

In the embodiment illustrated in FIG. 1, the aircraft 10 is a typical jet passenger transport aircraft but the invention is applicable to a wide variety of fixed wing aircraft types, including commercial, military, passenger, cargo, jet, propeller, general aviation, etc., with any number of engines attached to the wings or fuselage.

Figure 2:
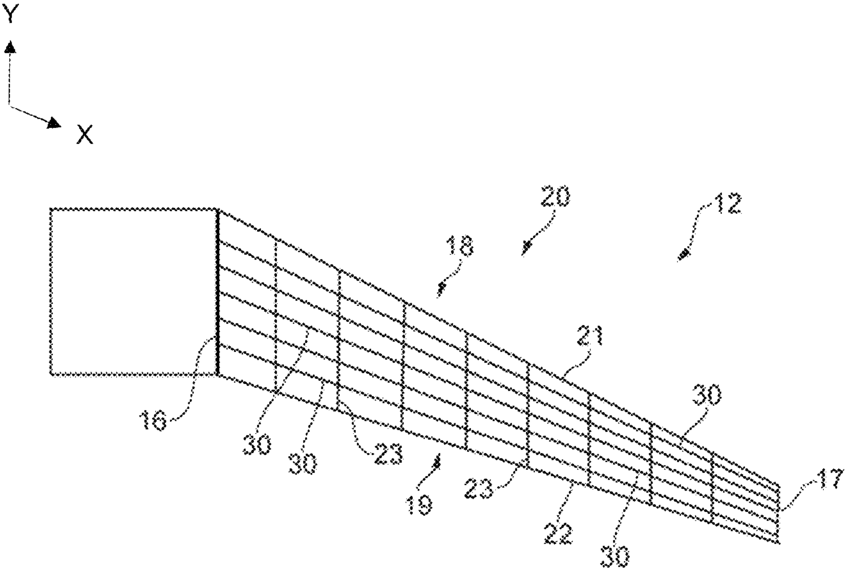
FIG. 2 is a schematic plan view of a wing of the aircraft illustrated in FIG. 1.

A schematic view of a wing box 20 of the starboard wing 12 is shown in FIG. 2. The port wing is similar in construction and so only a description of the starboard wing is provided herein.

The wing 12 has a cantilevered structure with a length extending in a spanwise direction from a wing root 16 to a wing tip 17, with the wing root 16 being joined to the aircraft fuselage 11. The wing 12 has a leading edge 18 and a trailing edge 19 as shown in FIG. 1. The leading edge 18 is at the forward end of the wing 12 and the trailing edge 19 is at the rearward end of the wing 12. The wing 12 comprises the wing box 20 and leading and trailing edge assemblies (not shown).

The leading and trailing edge assemblies may comprise one or more control surfaces (e.g., slats, flaps, ailerons, etc.) for controlling movement of the aircraft 10 about its longitudinal and/or transverse axes.

As shown in FIG. 2, the wing 12 has a spanwise axis (X) which extends in a direction from the wing root 16 to the wing tip 17, a chordwise axis (Y) which extends in the direction from the leading edge 18 to the trailing edge 19, and a thickness-wise axis (Z-shown in FIG. 3) which extends in a direction perpendicular to the chordwise (Y) and spanwise (X) axes.

The wing box 20 forms a structural assembly and includes forward and rear spars 21, 22 extending in a spanwise direction; ribs 23 extending between the forward and rear spars 21, 22 in a chordwise direction; upper and lower skins 24 on the upper and lower sides of the wing box 20; and stringers 30, to which the upper and lower skins 24 are mounted. It shall be appreciated that the upper and lower skins 24 define the outermost aerodynamic surfaces of the wing box 20.

Each of the forward 21 and rear 22 spars may be formed as a C-section with upper and lower flanges extending from an upstanding web. During assembly of the wing box 20, the upper and lower skins 24 are attached to the flanges of the forward 21 and rear 22 spars.

Figure 3:
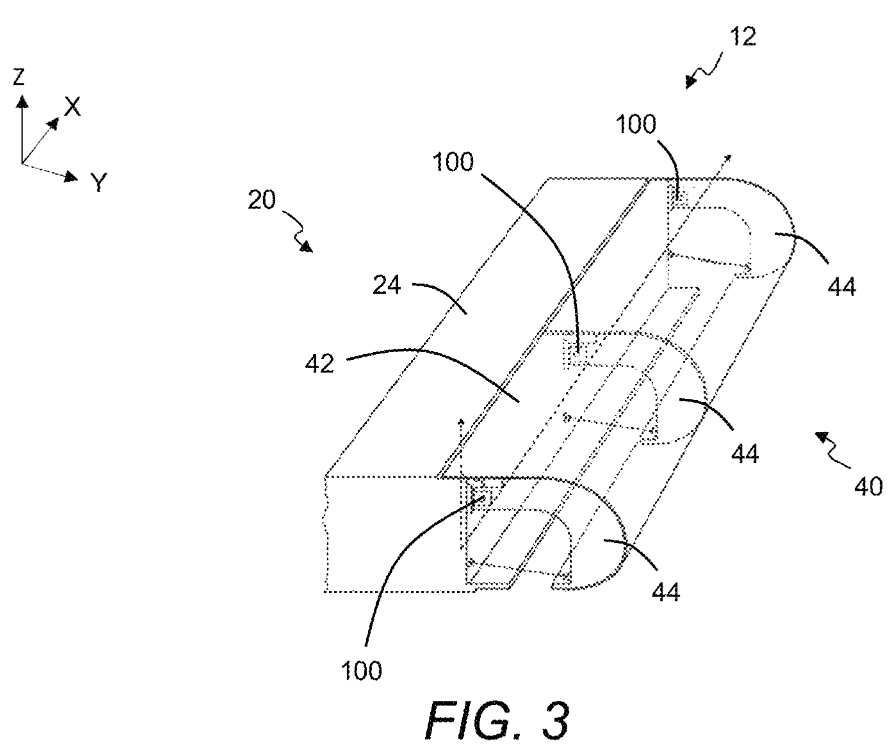
FIG. 3 is a schematic perspective view of a leading-edge assembly of the aircraft wing illustrated in FIG. 2.

Referring now to FIG. 3, a schematic view of a leading-edge assembly 40 of the starboard wing 12 is shown. The leading-edge assembly of the port wing is similar in construction and so only a description of the starboard wing leading edge assembly is provided herein.

The leading-edge assembly 40 (sometimes referred to as a leading edge "D-nose") is provided as a modular assembly, that is, a unitary preassembled structural module and may be pre-equipped with systems and/or actuation elements for actuating one or more control surfaces of the aircraft 10, such as the slats (not shown).

As shown in FIG. 3, the leading-edge assembly 40 comprises a skin 42 which is attached to a plurality of riblets 44 which are disposed at regular intervals in a spanwise direction along the leading-edge assembly 40. It shall be appreciated that the skin 42 of the leading-edge assembly 40 defines the outermost aerodynamic surface of the leading-edge assembly 40.

As shown in FIG. 3, the skin 42 sits substantially flush with the upper skin 24 of the wing box 20 so as to form a smooth, aerodynamic surface along the suction side of the aircraft wing 12.

In the illustrated embodiment, the skin 42 is formed from aluminium sheet and is bonded to an outer facing flange of the riblets 44 such that it defines the desired aerodynamic shape of the leading-edge region of the aircraft wing 12.

However, in other embodiments, the skin 42 may be formed from other suitable materials. For example, in some embodiments, the skin 42 may be formed of a composite material.

In the illustrated embodiment, the riblets 44 of the leading-edge assembly 40 are formed from a composite material.

However, in other embodiments, the riblets 44 may be formed from other suitable materials. For example, in some embodiments, the riblets 44 may be milled as a single piece from a billet of aviation grade aluminium alloy.

The leading-edge assembly 40 is attached to the wing box 20 via a plurality of joints 100 which connect the riblets 44 to the forward spar 21 of the wing box 20.

A respective one of the joints 100 shall now be described in further detail with reference to FIGS. 4 and 5.

It shall be appreciated that the remaining joints are of a substantially identical construction and so, for the sake of conciseness, only one of said joints shall be described in detail.

It shall also be appreciated that whilst three joints 100 are depicted in FIG. 3, in other embodiments the aircraft 10 may comprise any number of joints 100 such as 1, 2, 4, 5, 6, 7, 8, 9, 10, etc.

The joint 100 includes an eccentric bush 110 which is rotatably mounted to a first aircraft component (e.g., riblet 44), a projection 112 which is mounted on the eccentric bush 110, and a rail 120 which is rotatably mounted to a second aircraft component (e.g., forward spar 21).

It shall be appreciated that in embodiments comprising a plurality of joints, a single rail may be provided which is common to each joint or a plurality of rails may be provided, one for each joint.

In the illustrated embodiment, the eccentric bush 110 is mounted to one of the riblets 44 of the leading-edge assembly whilst the rail 120 is mounted to the forward (or leading-edge) spar 21 of the wing box 20.

However, it shall be appreciated that in other embodiments, the eccentric bush 110 and/or the rail 120 may be mounted to different components of the aircraft 10. For example, in some embodiments, the eccentric bush 110 may be mounted to the forward spar 21 of the wing box 20 and the rail 120 may be mounted to one of the riblets 44 of the leading-edge assembly 40.

It shall also be appreciated that in further embodiments, the joint 100 may be used in different parts of the aircraft 10 such as at one or more of the trailing edge assemblies (not shown) and/or the aircraft empennage and hence, in such embodiments, the eccentric bush 110 and the rail 120 may be mounted to aircraft components other than riblets and/or spars.

Figure 4A:
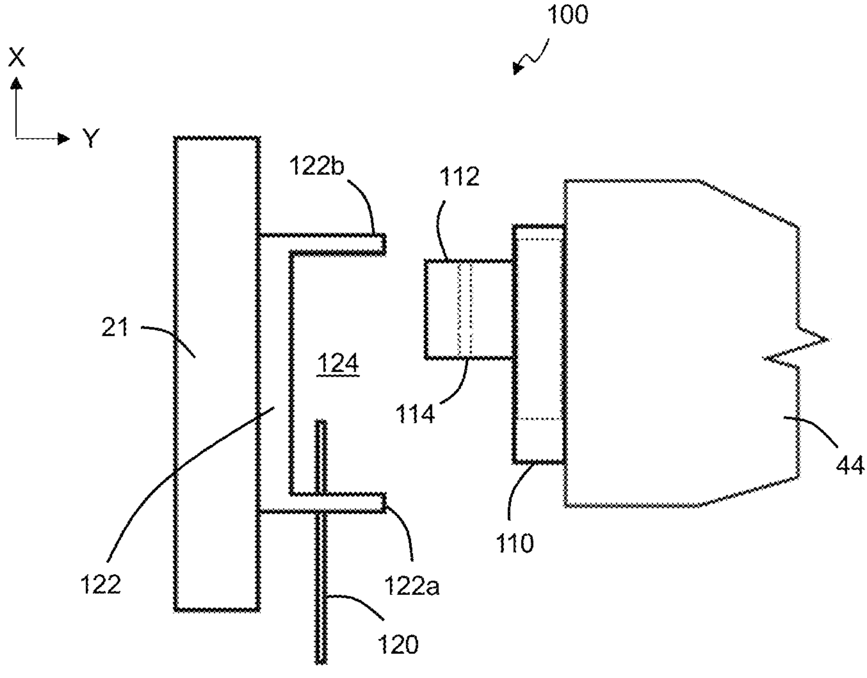
FIG. 4A is a top view of a joint assembly according to an embodiment of the present invention, in which the joint assembly is in a partially-assembled state.

As shown in FIG. 4A, the eccentric bush 110 comprises a rotational axis which, in the illustrated embodiment, extends in a direction substantially parallel to the chordwise (Y) axis of the aircraft wing 12.

The projection 112 extends outwardly away from the eccentric bush 110 and has a longitudinal axis which is orientated substantially parallel to, and spaced apart from, the rotational axis of the eccentric bush 110 such that rotation of the eccentric bush 110 about is rotational axis causes the projection 112 to move in both the spanwise (X) and the thickness-wise (Z) orthogonal directions relative to the leading-edge riblet 44.

As such, it shall be appreciated that rotation of the eccentric bush 110 about its rotational axis enables both the spanwise (X) and thickness-wise (Z) positions of the projection 112 to be adjusted as may be required in order comply with requisite engineering tolerances during manufacture of the aircraft 10.

It shall also be appreciated that in some embodiments, the rotational axis of the eccentric bush 110 may extend in a different direction and hence, in some embodiments, rotation of the eccentric bush 110 may cause the projection 112 to move in other directions relative to the leading-edge riblet 44.

Figure 4B:
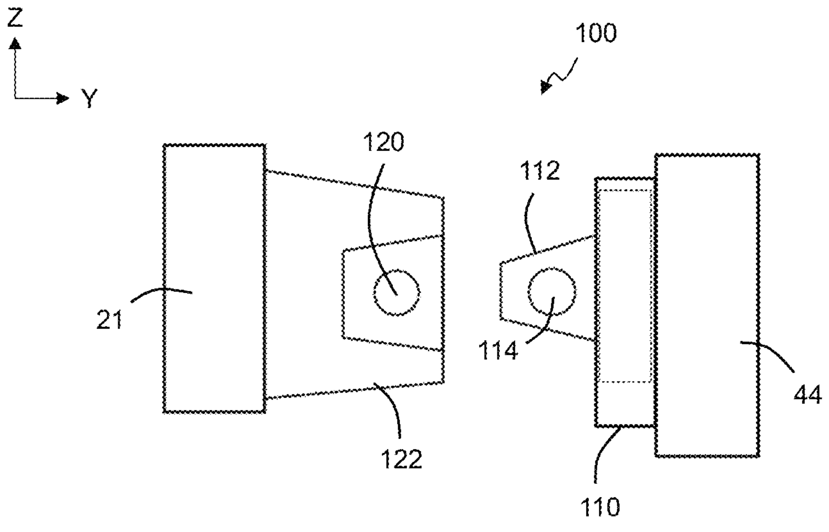
FIG. 4B is a side view of the joint assembly illustrated in FIG. 4A.

Referring now to FIG. 4B, the projection 112 includes a threaded aperture 114 which extends through the projection 112 and is configured for receiving the rail 120.

In the illustrated embodiment, the threaded aperture 114 extends through the projection 112 in the lateral (or width-wise) direction such that a longitudinal axis of the aperture 114 extends in a direction which is substantially parallel to the spanwise (X) axis of the aircraft wing 12.

However, it shall be appreciated that in other embodiments, the threaded aperture 114 may extend through the projection in the vertical (or thickness-wise direction) such that the longitudinal axis of the aperture 114 extends in a direction which is substantially parallel to the thickness-wise (Z) axis of the aircraft wing 12.

Figure 5A:
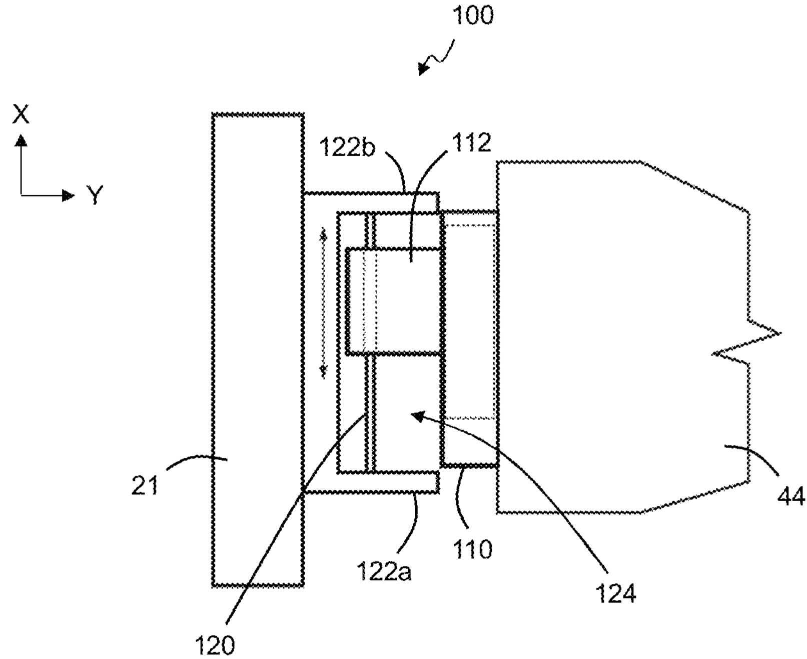
FIG. 5A is a top view of the joint assembly illustrated in FIGS. 4A and 4B in which the joint assembly is in a fully-assembled state.

Referring now to FIG. 5A, the rail 120 is rotatably mounted to the forward spar 21 such that a longitudinal axis of the rail 120 extends in a direction which is substantially parallel to the longitudinal axis direction of the threaded aperture 114.

In the illustrated embodiment, the rail 120 is mounted to the forward spar 21 such that its longitudinal axis is substantially parallel to the spanwise (X) axis of the aircraft wing 12.

Advantageously, since joints 100 for aircraft 10 typically experience higher loads in the thickness (or vertical) direction, orientating the rail 120 in the spanwise (or lateral) direction helps to reduce the magnitude of stress (or loading) which is placed on the rail 120 during use.

However, it shall be appreciated that in other embodiments, the rail 120 may be mounted to the forward spar 21 such that its longitudinal axis is substantially parallel to the thickness-wise (Z) axis of the aircraft wing 12.

Advantageously, whilst providing the rail 120 in such an orientation can place increased loads on the component during use, orientating the rail 120 in this manner can also help provide easier access to the rail 120 for aircraft assembly personnel and hence can help to improve aircraft assembly times.

It shall also be appreciated that in embodiments in which the rail 120 is orientated such that its longitudinal axis is substantially parallel to the thickness-wise (Z) axis of the aircraft wing 12, the threaded aperture 114 will also be orientated such that it extends through the projection 112 in the vertical (or thickness-wise) direction so that the rail 120 can be easily received within the aperture 114 during assembly (as shall be described in greater detail below).

As shown in FIG. 5A, once the joint 100 has been assembled such that the rail 120 is received within, and extends through, the threaded aperture 114, the threaded surface (not shown) provided on the exterior surface of the rail 120 will engage with the correspondingly threaded surface provided on the interior surface of the aperture 114 such that axial rotation of the rail 120 relative to the aperture 114 will cause the projection 112 to move along the rail in either the spanwise (X) or thickness-wise (Z) orthogonal direction depending on the orientation of the longitudinal axis of the rail 120.

This enables the spanwise or thickness-wise positions of the projection 112 to be adjusted accordingly to account for any unwanted changes in the spanwise or thickness-wise position of the projection 112 following rotation of the eccentric bush 110.

For example, in embodiments in which the longitudinal axis of the rail 120 is orientated in the lateral or spanwise (X) direction, the vertical or thickness-wise (Z) position of the projection 112 can be adjusted via rotation of the eccentric bush 110 and any subsequent changes in the lateral or spanwise position of the projection 112 following rotation of the eccentric bush 110 can be accounted for via rotating the rail 120 about its longitudinal axis so as to return the projection 112 back to a desired spanwise position.

Alternatively, in embodiments in which the longitudinal axis of the rail 120 is orientated in the vertical or thickness-wise (Z) direction, the lateral or spanwise (X) position of the projection can be adjusted via rotation of the eccentric bush 110 and any subsequent changes in the vertical or thickness-wise (Z) position of the projection following rotation of the eccentric bush 110 can be accounted for via rotating the rail 120 about its longitudinal axis so as to return the projection 112 back to a desired thickness-wise position.

Furthermore, it shall also be appreciated that the rail 120 may be axially rotated in either a first (e.g., clockwise) rotational direction to cause the projection 112 to move in a first linear direction along the rail 120 (e.g., towards the tip end 17 of the wing 12 or upwardly towards the upper cover 24) or a second (e.g., anti-clockwise) rotational direction to cause the projection 112 to move in the opposite linear direction along the rail 120 (e.g., towards the root end 16 of the wing 12 or downwardly towards the lower cover 24).

As such, in this manner, the joint 100 of the claimed invention allows engineers and assembly personnel to precisely control the steps or gaps between aircraft components during assembly as may be necessary to ensure that the constitute components of the aircraft 10 conforms to requisite engineering tolerances.

It shall also be appreciated that in the illustrated embodiment, the threaded rail 120 has a length which is greater than, or equal to, the distance between the positions of maximum displacement of the projection 112 to help ensure that, following rotation of the eccentric bush 110, any corresponding changes in the spanwise or thickness-wise orthogonal positions of the projection 120 can be fully accounted for by moving the projection along the rail 120.

Referring still to FIG. 5A, in the illustrated embodiment, the rail 120 is provided in the form of a threaded screw or bolt and is mounted to the forward spar 21 of the aircraft wing box 20 via a U-shaped receptacle 122 (e.g., a clevis).

However, it shall be appreciated that in other embodiments, the rail 120 may be mounted directly to the forward spar 21 and hence the U-shaped receptacle 122 may be omitted in some embodiments.

As shown in FIG. 5A, the U-shaped receptacle 122 is fixed (or mounted) to the forward spar 21 and comprises a pair of end portions 122*a*, 122*b* between which a channel 124 is defined (within which the rail 120 is provided).

In the illustrated embodiment, the channel 124 is provided as an open channel. However, it shall be appreciated that in other embodiments, the channel 124 may be a closed channel. For example, in some embodiments, the channel 124 may be provided via machining a slit or a cut directly into a portion of the forward spar 21.

Figure 5B:
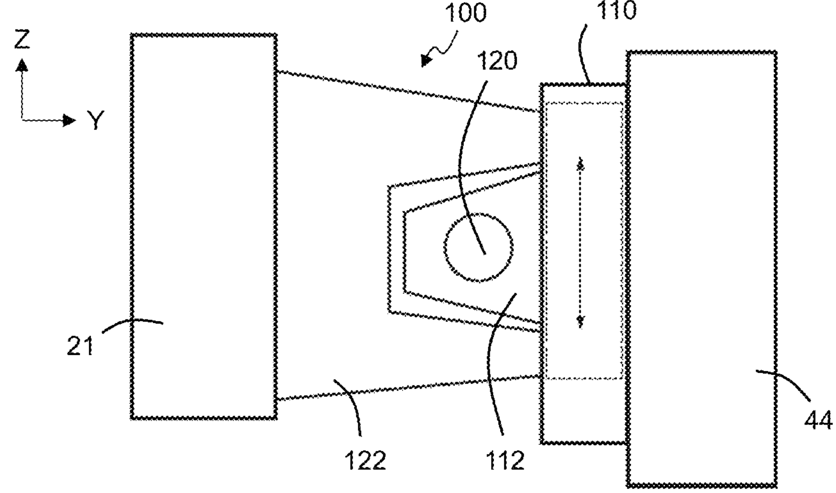
FIG. 5B is a side view of the joint assembly illustrated in FIG. 5A.

Referring now to FIG. 5B, the channel 124 is sized for receiving the projection 112 when the first and second aircraft components are brought together.

In the illustrated embodiment, the projection 112 is provided in the form of a tapered spigot and hence the channel 124 also features a substantially trapezoidal cross-sectional shape which corresponds to the cross-sectional shape of the tapered spigot.

However, it shall be appreciated that in other embodiments, a different type of projection 112 may be provided and hence the channel 124 may also have a different cross-sectional shape corresponding to that of the projection 112.

The respective end portions 122*a*, 122*b* of the U-shaped receptacle 122 each comprise a respective aperture (not shown) to allow the rail 120 to be introduced into the channel 124 during assembly of the joint 100.

As such, the rail 120 is supported at either end by the respective end portions 122*a*, 122*b* of the U-shaped receptacle 122 and extends between the respective end portions 122*a*, 122*b* of the receptacle 122 such that the longitudinal axis of the rail 120 aligns with that of the channel 124. In other words, the channel 124 has a longitudinal axis which extends in a direction substantially parallel to that of the rail 120.

It shall also be appreciated that the respective ends of the rail 120 (which are supported by the end portions 122*a*, 122*b* of the U-shaped receptacle 122) are left un-threaded so as to allow the rail 120 to axially rotate with respect to the U-shaped receptacle 122.

Referring still to FIG. 5B, the respective end portions 122*a*, 122*b* of the U-shaped receptacle 122 are configured to abut against the eccentric bush 110 when the projection 112 is received within the channel 124.

Advantageously, it has been found that abutting the end portions 122*a*, 122*b* of the receptacle 122 against the eccentric bush 110 helps to prevent unwanted pivoting of the riblet 44 about the rail 120 and also enables the channel 124/receptacle 122 to take up any vertical or thickness-wise loads which may be applied to the joint 100 during use, thereby reducing amount of vertical loading which is placed on the rail 120.

Figure 6:
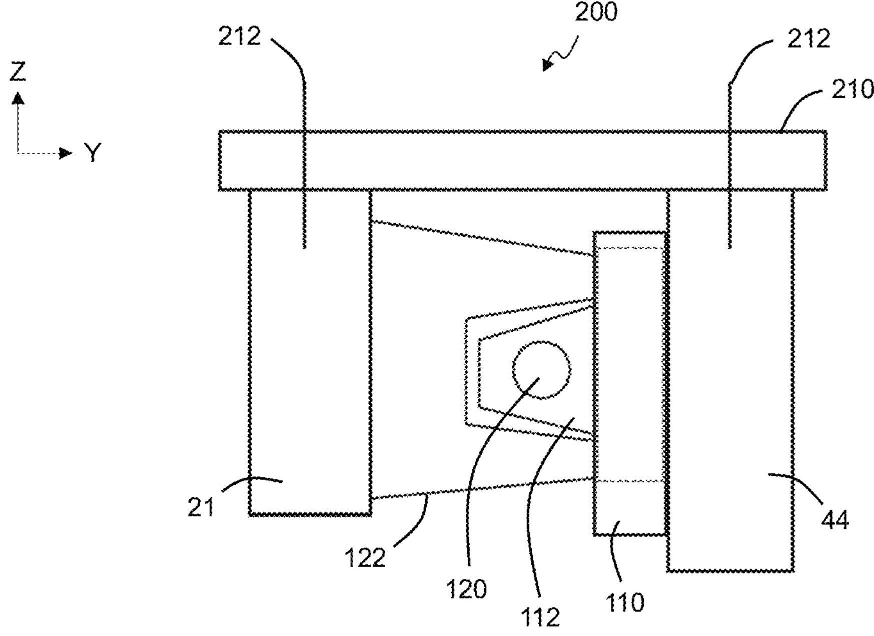
FIG. 6 is a side view of a joint assembly according to another embodiment of the present invention, in which a butt-strap is provided between the first and second aircraft components.

Referring now to FIG. 6, a joint assembly 200 according to an alternative embodiment is depicted.

It shall be appreciated that the joint assembly 200 illustrated in FIG. 6 is largely identical to the joint assembly 100 depicted in FIGS. 4 and 5 and so only the differences shall be described herein. Like reference numerals denote like parts with FIGS. 4 and 5.

Notably, unlike the joint assembly 100 depicted in FIGS. 4 and 5, the joint assembly 200 includes a butt-strap 210 which extends between the first and second aircraft components. As shown in FIG. 6, the butt-strap 210 is secured to the first and second aircraft components at either end via suitable fasteners 212.

Advantageously, it has been found that the provision of a butt-strap 210 helps take up chordwise tension loads across the joint 200 and hence thereby reduces the magnitude of such loads which are exerted on the rail 120 during use. It has also been found that the provision of a butt-strap 210 further helps to prevent unwanted pivoting of the riblet 44 about the rail 120.

As with the first embodiment illustrated in FIGS. 4 and 5, the joint assembly 200 depicted in FIG. 6 is for joining a leading-edge assembly 40 to an aircraft wing box 20 and hence the butt-strap 210 depicted in FIG. 6 extends between one of the riblets 44 of the leading-edge assembly 40 and the forward spar 21 of the aircraft wing box 20.

However, it shall be appreciated that in other embodiments, the joint assembly 200 may be used in different parts of the aircraft 10, such as at one or more of the trailing edge assemblies (not shown) and/or the aircraft empennage, and hence in such embodiments the butt strap 210 may extend between different components of the aircraft 10.

It shall also be appreciated that in some embodiments, the butt-strap 210 may be omitted.

Figure 7:
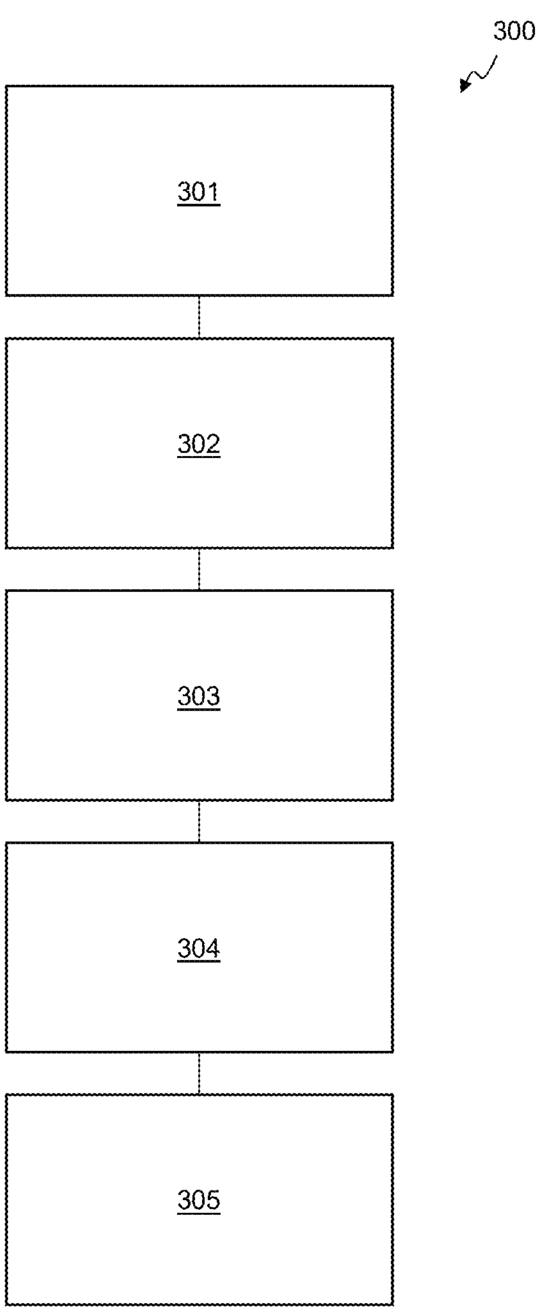
FIG. 7 is a flow chart depicting a method of joining a first aircraft component to a second aircraft component according to an embodiment of the present invention.

Referring now to FIG. 7, a method 300 of joining a first aircraft component to a second component shall now be described according to an embodiment of the invention.

During step 301 of the method, the eccentric bush 110 is rotatably mounted to a first aircraft component.

As set out above, in the embodiments illustrated in FIGS. 4 to 6, the first aircraft component is a riblet 44 of a leading-edge assembly 40 but may be a different component in other embodiments.

Next, the rail 120 is rotatably mounted to a second aircraft component during step 302.

As set out above, in the embodiments illustrated in FIGS. 4 to 6, the second aircraft component is a forward spar 21 but may be a different component in other embodiments.

Furthermore, as illustrated in FIGS. 5A and 5B, in the illustrated embodiment the rail 120 is mounted to the second aircraft component such that the longitudinal axis of the rail 120 extends in a direction substantially parallel to the spanwise (X) direction of the aircraft wing 120.

However, as set out earlier within this application, it shall be appreciated that in other embodiments, the rail 120 may be mounted to the second aircraft component such that the longitudinal axis of the rail 120 extends in a direction substantially parallel to the thickness-wise (Z) direction of the aircraft wing 120.

The eccentric bush 110 is then rotated about its rotational axis during step 303 so as to alter the position of the projection 112 relative to the first aircraft component in either the spanwise (X) or thickness-wise (Z) orthogonal directions.

In embodiments in which the longitudinal axis of the rail 120 is orientated in the lateral or spanwise (X) direction, the eccentric bush 110 is rotated during step 303 to adjust the vertical (or thickness-wise) position of the projection 112 relative to the first aircraft component such that the vertical position of the projection 112 precisely matches that of the channel 124.

Alternatively, in embodiments in which the longitudinal axis of the rail 120 is orientated in the vertical or thickness-wise (Z) direction, the eccentric bush 110 is rotated during step 303 to adjust the lateral (or spanwise) position of the projection 112 relative to the first aircraft component such that the spanwise position of the projection 112 precisely matches that of the channel 124.

Once the projection 112 has been moved to the desired position via rotation of the eccentric bush 110, the projection 112 is inserted into the channel 124 and the rail 120 is inserted into the channel 124 and located within the aperture 114 during step 304 such that the threaded surface of the rail 120 engages with the correspondingly threaded surface of the aperture 114.

Finally, at step 305, the spanwise or thickness-wise position of the projection 112 is adjusted to account for unwanted movement of said projection 112 in the spanwise or thickness-wise directions (following rotation of the eccentric bush 110) via axially rotating the rail 120 relative to the aperture 114, thereby returning the projection 112 back to a desired orthogonal position.

For example, in embodiments in which the longitudinal axis of the rail 120 is orientated in the lateral or spanwise (X) direction, the rail 120 is rotated about its longitudinal axis to account for any unwanted changes in the spanwise position of the projection 112 caused by rotating the eccentric bush 110 during step 303.

Alternatively, in embodiments in which the longitudinal axis of the rail 120 is orientated in the vertical or thickness-wise (Z) direction, the rail 120 is rotated about its longitudinal axis so account for any unwanted changes in the vertical position of the projection 112 caused by rotating the eccentric bush 110 during step 303.

Notably, it has been found that the aforementioned method provides a more ergonomic means of fitting and adjusting aircraft components and hence allows for improved tolerance management and faster assembly times when compared to other known solutions (such as double eccentric bushes).

It shall also be appreciated that since double eccentric bushes tend to be large and heavy, the joint assembly 100 of the claimed invention additionally provides a weight and space saving benefit to the aircraft 10.

Where the word "or" appears this is to be construed to mean "and/or" such that items referred to are not necessarily mutually exclusive and may be used in any appropriate combination.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A joint assembly for joining a first aircraft component to a second aircraft component, said joint assembly comprising:

an eccentric bush for rotatably mounting to a first aircraft component, said eccentric bush comprising a rotational axis;

a projection mounted on said eccentric bush such that rotation of the eccentric bush about the rotational axis causes movement of the projection in both a first and a second orthogonal direction relative to the first aircraft component, wherein said first and second orthogonal directions are substantially perpendicular to the rotational axis of the eccentric bush; and a rail for rotatably mounting to a second aircraft component, wherein the rail has a longitudinal axis which extends in a direction substantially parallel to the second orthogonal direction, wherein the projection comprises an aperture for receiving said rail, and wherein the rail comprises a threaded surface which is configured to engage with a correspondingly threaded surface of the aperture such that, when the rail is received within the aperture, axial rotation of the rail relative to the aperture causes the projection to move along the rail in the second orthogonal direction.

2. The joint assembly according to claim 1, wherein the joint assembly further comprises a channel for receiving the projection, and wherein the rail is provided within said channel.

3. The joint assembly according to claim 2, wherein the joint assembly further comprises a receptable for mounting the rail to the second aircraft component, and wherein said receptacle comprises a pair of end portions between which the channel is defined.

4. The joint assembly according to claim 3, wherein the end portions of the receptacle are configured to abut against the eccentric bush when the projection is received within the channel.

5. The joint assembly according to claim 4, wherein the rail has a length which is greater than or equal to a distance between the positions of maximum displacement of the projection.

6. An airfoil structure comprising:

a first aircraft component;

a second aircraft component; and at least one joint assembly according to claim 1, wherein the eccentric bush is rotatably mounted to the first aircraft component, and wherein the rail is rotatably mounted to the second aircraft component.

7. The airfoil structure according to claim 6, wherein the rotational axis of the eccentric bush extends in a direction substantially parallel to a chordwise axis of the airfoil structure.

8. The airfoil structure according to claim 6, wherein the longitudinal axis of the rail extends in a direction substantially parallel to a spanwise axis of the airfoil structure.

9. The airfoil structure according to claim 6, wherein the longitudinal axis of the rail extends in a direction substantially parallel to a thickness-wise axis of the airfoil structure.

10. The airfoil structure according to claim 6, wherein the joint assembly further comprises at least one butt-strap extending between the first and second aircraft components.

11. The airfoil structure according to claim 6, wherein the airfoil structure is an aircraft wing.

12. The airfoil structure according to claim 6, wherein the first aircraft component is a riblet, and optionally wherein said riblet forms part of a leading edge assembly.

13. The airfoil structure according to claim 6, wherein the second aircraft component is a spar, and wherein said spar is a forward spar of an aircraft wing.

14. An aircraft comprising the airfoil structure according to claim 6.

15. A method of joining a first aircraft component to a second aircraft component comprising:

rotatably mounting an eccentric bush to a first aircraft component, said eccentric bush comprising a rotational axis and a projection mounted on said eccentric bush such that rotation of the eccentric bush about the rotational axis causes movement of the projection in both a first and a second orthogonal direction relative to the first aircraft component, wherein said first and second orthogonal directions are substantially perpendicular to the rotational axis of the eccentric bush, and wherein the projection further comprises an aperture having a threaded surface;

rotatably mounting a rail having a correspondingly threaded surface to a second aircraft component, wherein said rail has a longitudinal axis which extends in a direction substantially parallel to the second orthogonal direction;

rotating the eccentric bush about its rotational axis so as to alter a position of the projection in the first orthogonal direction;

locating the rail within the aperture provided in the projection such that the threaded surface of the rail engages with the threaded surface of the aperture; and axially rotating the rail relative to the aperture so as to move the projection along said rail in the second orthogonal direction so as to account for unwanted changes in the position of the projection in the second orthogonal direction following rotation of the eccentric bush.

* * * * *